(12) United States Patent
Ortega

(10) Patent No.: US 6,481,947 B2
(45) Date of Patent: Nov. 19, 2002

(54) AIRCRAFT BRAKE AND TIRE REMOVAL AND STORAGE APPARATUS

(76) Inventor: John Ortega, 4333 Hoffman Ave., Spring Hill, FL (US) 34606

( * ) Notice: Subject to any disclaimer, the term of this patent is extended or adjusted under 35 U.S.C. 154(b) by 67 days.

(21) Appl. No.: 09/738,339

(22) Filed: Dec. 15, 2000

(65) Prior Publication Data

US 2002/0076311 A1 Jun. 20, 2002

(51) Int. Cl.$^7$ .............................................. B60B 29/00
(52) U.S. Cl. ...................................................... 414/426
(58) Field of Search ................ 414/426–430; 280/47.26

(56) References Cited

U.S. PATENT DOCUMENTS

| | | | | |
|---|---|---|---|---|
| 3,951,287 A | * | 4/1976 | Cofer | 214/331 |
| 4,294,463 A | * | 10/1981 | Kotani | 280/646 |
| 4,431,211 A | * | 2/1984 | Carrigan | 280/655 |
| 4,771,531 A | * | 9/1988 | Asher | 414/427 |
| 5,007,789 A | * | 4/1991 | Painter | 29/426.3 |
| 5,333,885 A | * | 8/1994 | Pullman | 280/47.19 |
| 5,362,194 A | * | 11/1994 | Kassebaum | 414/427 |
| 5,378,004 A | * | 1/1995 | Gunlock et al. | 280/47.2 |
| 5,378,005 A | * | 1/1995 | Norton | 280/47.26 |
| 5,660,296 A | * | 8/1997 | Greenwich | 220/326 |
| 5,820,330 A | * | 10/1998 | Focke et al. | 414/427 |
| 5,885,047 A | * | 3/1999 | Davis et al. | 414/490 |
| 5,893,572 A | * | 4/1999 | Parks | 280/47.18 |
| 6,000,713 A | * | 12/1999 | Lin | 280/647 |
| 6,095,745 A | * | 8/2000 | Garnett | 414/427 |
| 6,176,559 B1 | * | 1/2001 | Tiramani et al. | 312/108 |

* cited by examiner

Primary Examiner—Kathy Matecki
Assistant Examiner—Sang Kim
(74) Attorney, Agent, or Firm—John Lezdey

(57) ABSTRACT

The invention provides a wheeled apparatus for transporting a brake assembly and/or a tire assembly from an aircraft. The apparatus contains a slideable hollow housing which can be adjusted in height by a jack associated with the apparatus.

A brake assembly can be placed within the housing for transportation or storage. On the bottom front of the housing is a stand for removing a tire assembly.

9 Claims, 3 Drawing Sheets

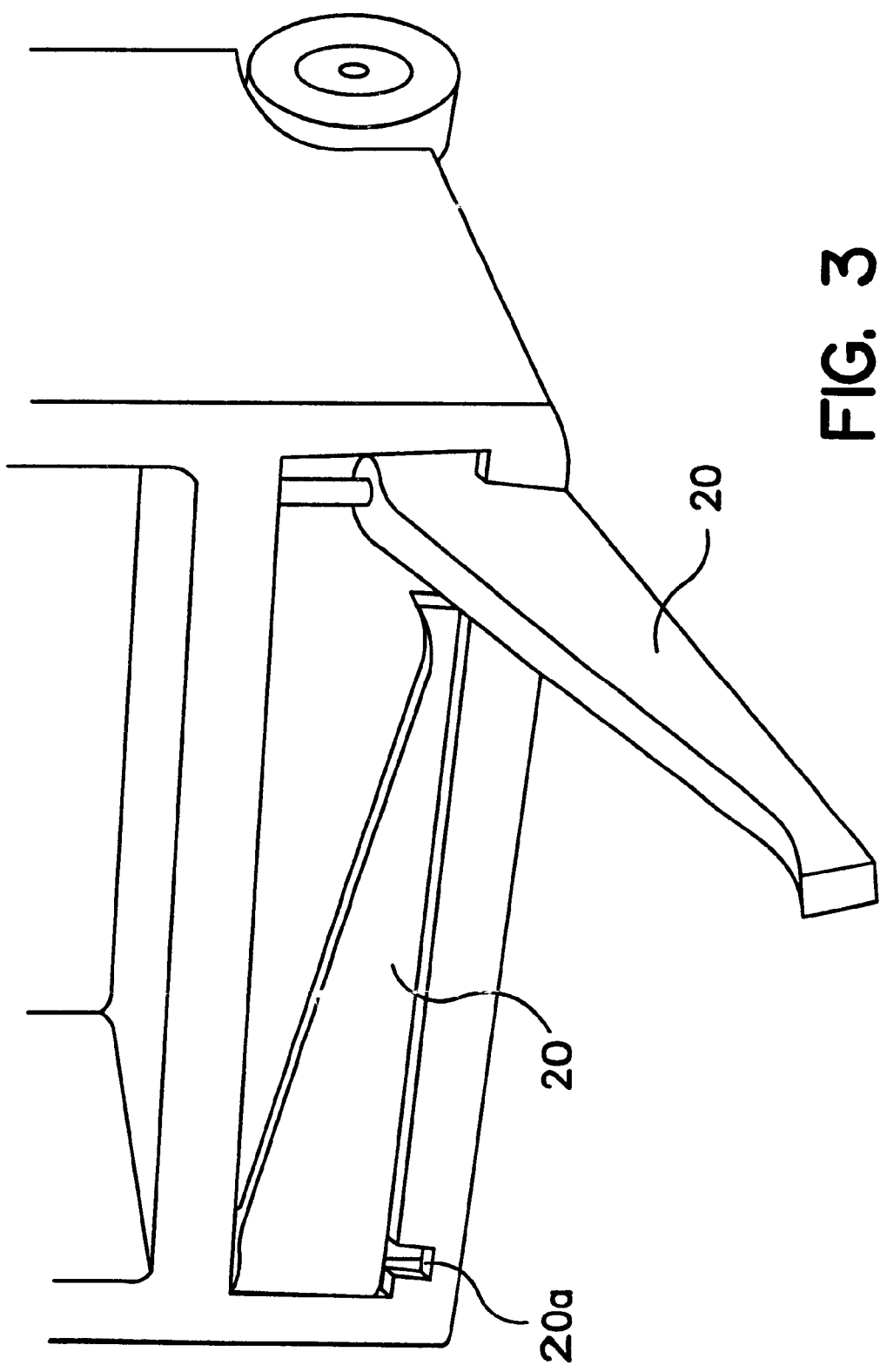

AIRCRAFT BRAKE AND TIRE REMOVAL AND STORAGE APPARATUS

FIELD OF THE INVENTION

The invention relates to an apparatus for removing or replacing aircraft brake assembly and/or tire assembly. The apparatus is also used to store or ship the brakes or tires of aircraft.

BACKGROUND OF THE INVENTION

The tires and brakes of aircraft are constantly subjected to friction and stress which rapidly wear the brakes and tires. Because of safety regulations, the brakes and tires must be carefully examined and replaced when required in order to avoid any brake or tire-related accidents.

The brakes and tires of many commercial aircraft are huge and weigh heavily. These items generally require more than one person to remove and/or replace the tires or brakes. Generally, the items are handled manually and require a forklift or cart to transport the items after they are removed and sent to storage. In storage, the tires are stacked and the brakes must be carefully handled and stored to prevent scoring. After repair or inspection, the items need to be transported to be placed on the aircraft. Since the items are bulky and heavy, more than one person participates in the activity. The manual handling of the tires and brakes is time consuming and requires several maintenance personnel to act.

There is a need in the airline industry to provide a safer, easier and less costly method in man-hours to deal with the removal, replacement and/or storage of tires and brakes.

SUMMARY OF THE INVENTION

There is provided an apparatus for assisting in the removal and/or replacement of brakes and/or tires of an aircraft. Accordingly, there is provided a cart having a frame comprising a pair of spaced apart vertical tube members joined at the bottom by a rear horizontal bar having a wheel attached at each end of the horizontal bars extending at a back end perpendicularly from each end of the bottom bar. The horizontal bars are joined at a front end by a front tube member. The front tube member has a vertical bar at each end and is parallel to the back bar. A housing for the brake assembly is placed on the frame for housing the brake assembly. Support means is provided for supporting a brake assembly placed into the housing and means on the bottom front end of said apparatus for supporting a tire assembly outside of the housing. Preferably, the brake assembly is mounted into a separate container which is placed in the housing.

Advantageously, there is provided a means for adjusting the height of said housing to permit proper alignment of said tire assembly or brake assembly so as to remove it and slide it into position in the housing.

It is a general object of the invention to provide an apparatus to assist in the removal and/or replacement of an aircraft brake assembly or tire assembly.

It is another object of the invention to provide a means for transporting and storing an aircraft brake assembly.

It is yet another object of the invention to provide an apparatus which can assist in removal and storage of an aircraft brake assembly using only one person.

It is yet another object of the invention to provide a much safer way of removing the brake assembly and tire assembly without injury to personnel.

These and other objects will be better understood from the drawings and from the description of the preferred embodiments.

BRIEF DESCRIPTION OF THE DRAWINGS

FIG. 3 shows one type of tire stand used on the apparatus of the invention.

DESCRIPTION OF THE PREFERRED EMBODIMENTS

Figure 1:
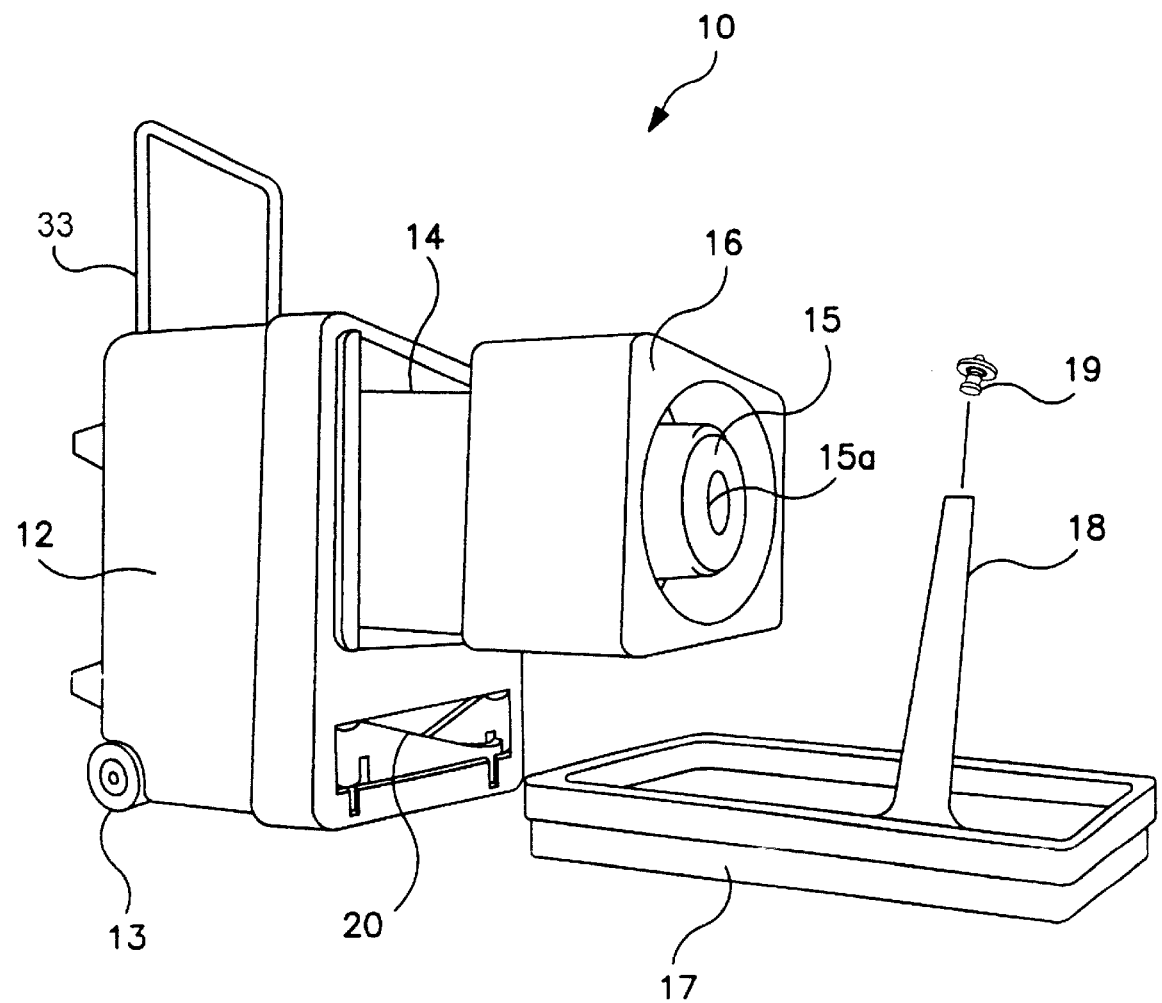
FIG. 1 is a perspective view of an apparatus of the invention.

As shown in FIG. 1, the apparatus 10 of the invention comprises a frame 11 on which a housing 12 is slideably and removably mounted. The frame 11 has a pair of wheels 13 at least mounted at the rear of the frame so as to maneuver the apparatus 10. The housing 12 has a cavity 14 into which there can be placed a brake assembly 15 from an aircraft. Preferably, the brake assembly 15 is mounted within an optional container 16 to prevent any damage to the brake assembly 15 while handling. A cover 17 having a support 18 covers the housing 12 when the brake assembly 15 is being transported or housed. A lock nut 19 is used to lock the cover 17 in place when it is placed on the housing 12 with the support 18 extending through an opening 15a of the brake assembly to a rear opening in the housing 12 (not shown).

At the bottom of the housing 12 is a pair of arms 20 which can be extended out through the front of the housing 12 so as to be used to remove a tire assembly.

Figure 2:
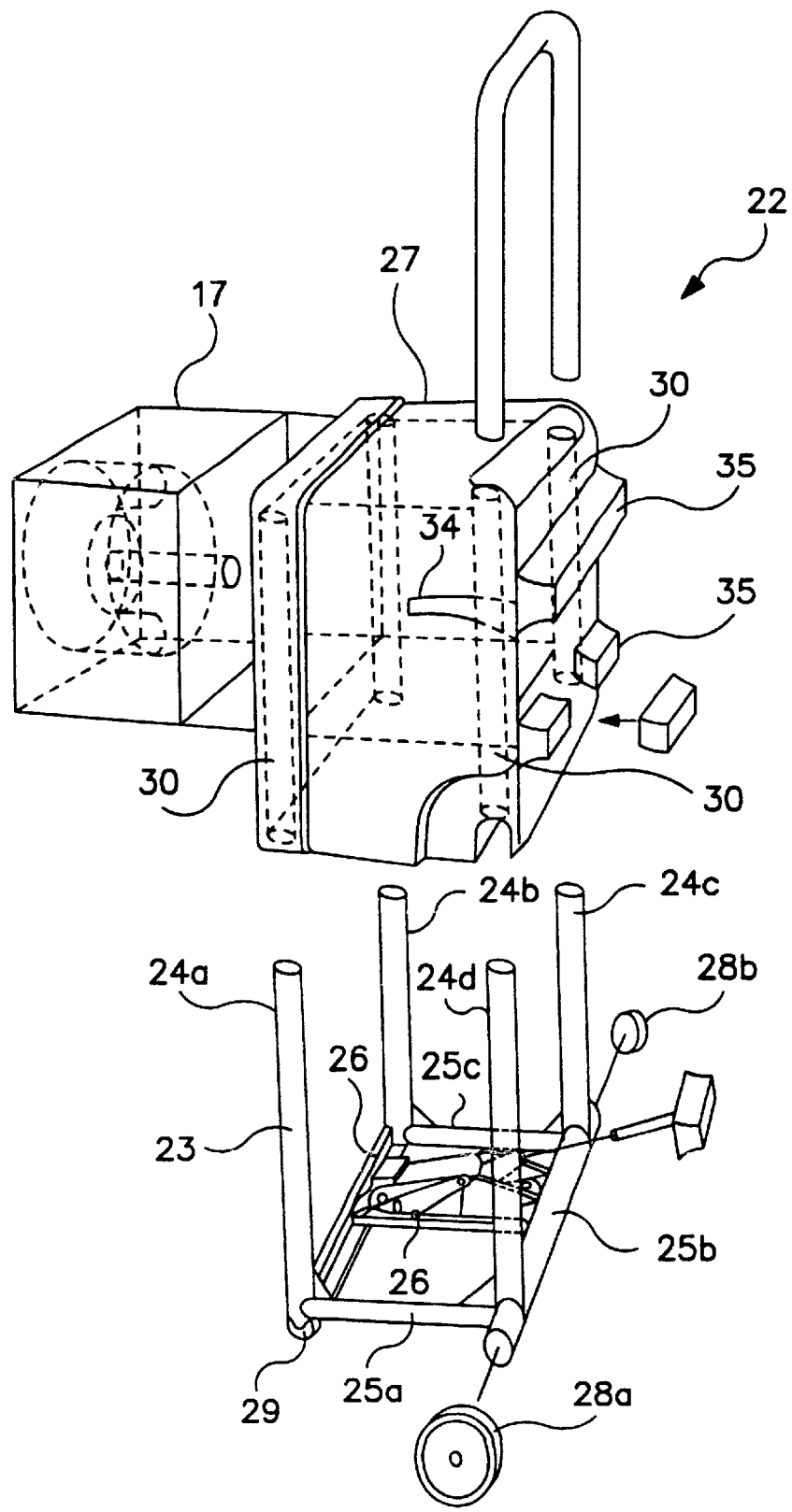
FIG. 2 is an exploded view of another embodiment of the invention.

FIG. 2 illustrates a further embodiment of the invention. In FIG. 2, an apparatus 22 comprises a frame 23 that is formed by vertical tubes 24a, 24b, 24c, and 24d. The vertical tubes 24a, 24b, 24c, and 24d are connected at the bottom of three sides with tubes 24a, 24b, 24c and at the front with a bar 26 which together with tube 25b holds a jack 26 for raising and lowering the housing. At the ends of tube 25b is a pair of wheels 28a, 28b. Optionally, there may be front wheels 29 at the bottom of tubes 24a, 24b for use with heavy loads.

The housing 27 has channels 30 so as to be slideable along the vertical tubes 24a, 24b, 24c, and 24d. A jack 26 moves the housing 27 up and down so as to position the housing 27 to receive a brake assembly. The jack 26 can be either mechanical or pneumatic.

The frame has a handle member 33 which is associated with the rear vertical tubes 24c, 24d for maneuvering the apparatus 22. An optional container is used to house a brake assembly before it is placed within the housing 27. The rear of the housing. 27 can have on its interior a support member 34 which passes through an opening in a brake assembly to support and stabilize it within the housing 27.

On the rear of the housing 27 there is provided a stand member 35 upon which the apparatus will rest while in storage. These raised portions are separated so as to be accessible to a forklift for storage.

As shown in FIG. 3, a fire stand for transporting tires can be placed at the bottom of the apparatus. A pair of arms 20 are located in the bottom of the housing which can be swiveled out of the housing and dropped and locked into a slot 2a. The apparatus can be used to remove and transport tires alone or with a brake assembly housed within the housing.

The housing can be about 16 to 18 inches in depth and should contain an opening so as to house the container for the brake assembly which is generally 22"×22"×13" and can contain most brake drums. The radius of a brake assembly is normally about 8½ inches and contains an opening through which a support in the housing or on the cover can pass.

Preferably, the housing and the insert container comprise a heavy duty plastic such as polycarbonate, nylon or the like.

In operation, an empty housing is slid onto the frame. A brake assembly is removed from an aircraft and placed on a support within the housing. A cover is placed on the housing and the housing is wheeled to storage. The housing is placed on the outside stand members on its rear and the frame removed from the channels in the housing. The housing can thereafter be fork lifted into position for storage.

Alternatively, when the cover contains the brake assembly support, the brake assembly is placed onto the cover. The housing is placed over the brake assembly by itself or in a protective container and the support is locked on the back of the housing. The housing can thereafter be lifted and wheeled to storage.

Although the, invention has been described with preferred embodiments, it is understood that variations and modifications may be employed without departing from the concept of the invention as defined in the claims.

What is claimed is:

1. An apparatus for removal, replacement, and/or storage of an aircraft tire, brake assembly or a combination thereof which comprises:

A) A cart having a frame comprising:
      a pair of spaced apart vertical tubular members attached at their bottom to a rear horizontal bar having a wheel attached at each end; a pair of spaced apart horizontal bars perpendicular to said rear horizontal bar and extending forward; and
      a front bar parallel to said rear horizontal bar and connected at its ends-to a spaced apart horizontal bar;

B) a housing for said brake assembly, said housing being removably and slideably mounted on said frame for housing said brake assembly, said housing having an opening at its front for receiving said brake assembly into said housing;

C) means for supporting a tire assembly on said apparatus; and

D) said cover, containing an elongated support means for passing through an opening in a brake assembly to the rear of said housing.

2. The apparatus of claim 1 wherein said housing contains a support member within said housing which passes through an opening in a brake assembly for stabilizing and supporting a brake assembly within said housing.

3. The apparatus of claim 1 including a container for housing said brake assembly, said container being capable of entering said opening in said housing.

4. The apparatus of claim 1 including a jack for moving said housing vertically along said frame.

5. The apparatus of claim 4 wherein said jack is a mechanical jack.

6. The apparatus of claim 4 wherein said jack is a pneumatic jack.

7. The apparatus of claim 1 wherein said means for supporting a tire assembly comprises a pair of swiveling arms which swivel out from the bottom of said housing.

8. The apparatus of claim 1 including a pair of wheels on the front end of said frame.

9. The apparatus of claim 1 including a removable handle.

* * * * *